United States Patent
Tanaka et al.

(10) Patent No.: US 9,748,815 B2
(45) Date of Patent: Aug. 29, 2017

(54) ROTARY COMPRESSOR WITH THE BALANCE WEIGHT FORMED WITH A RECESS FOR RECEIVING THE HEAD OF A RIVET

(71) Applicant: DAIKIN INDUSTRIES, LTD., Osaka-shi, Osaka (JP)

(72) Inventors: Kouichi Tanaka, Sakai (JP); Kazutaka Hori, Sakai (JP); Takashi Shimizu, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 392 days.

(21) Appl. No.: 14/432,165

(22) PCT Filed: Jun. 19, 2013

(86) PCT No.: PCT/JP2013/003812
§ 371 (c)(1),
(2) Date: Mar. 27, 2015

(87) PCT Pub. No.: WO2014/049914
PCT Pub. Date: Apr. 3, 2014

(65) Prior Publication Data
US 2015/0244238 A1 Aug. 27, 2015

(30) Foreign Application Priority Data
Sep. 28, 2012 (JP) ................. 2012-217961

(51) Int. Cl.
*H02K 7/04* (2006.01)
*H02K 1/28* (2006.01)
(Continued)

(52) U.S. Cl.
CPC ............. *H02K 7/04* (2013.01); *F04C 18/30* (2013.01); *F04C 23/008* (2013.01);
(Continued)

(58) Field of Classification Search
CPC ... F04C 15/0042; F04C 18/0215; F04C 23/008; F04C 29/0021; F04C 2230/605
(Continued)

(56) References Cited

U.S. PATENT DOCUMENTS

| | | | |
|---|---|---|---|
| 2008/0211340 A1* | 9/2008 | Lee | H02K 1/246 310/216.004 |
| 2008/0267799 A1* | 10/2008 | Kim | F04B 35/045 417/423.1 |
| 2010/0150752 A1* | 6/2010 | Nakamura | F04C 29/028 417/410.5 |

FOREIGN PATENT DOCUMENTS

| | | |
|---|---|---|
| CN | 101749236 A | 6/2010 |
| JP | 2007-154657 A | 6/2007 |

(Continued)

OTHER PUBLICATIONS

International Search Report of corresponding PCT Application No. PCT/JP2013/003812 dated Jul. 16, 2013.
(Continued)

*Primary Examiner* — Devon Kramer
*Assistant Examiner* — Christopher Brunjes
(74) *Attorney, Agent, or Firm* — Global IP Counselors, LLP

(57) ABSTRACT

A rotary compressor includes a casing, an electric motor, a compression mechanism and a balance weight mechanism. The electric motor includes a stator fixed to the casing, and a rotor. The compression mechanism is connected to the electric motor via a drive shaft. The balance weight mechanism is configured to cause centrifugal force to act on the drive shaft. The rotor includes a rotor core including a plurality of stacked electromagnetic steel sheets, and a rivet configured to clamp the rotor core at axial ends of the rotor core. The balance weight mechanism includes an insertion portion into which drive shaft is press fit, and a flat portion
(Continued)

forming a flat surface at an axial end of the drive shaft. The balance weight mechanism is disposed at an axial end portion of the rotor to cover a head of the rivet.

2 Claims, 3 Drawing Sheets

(51) Int. Cl.
  *F04C 29/00* (2006.01)
  *F04C 18/30* (2006.01)
  *F04C 23/00* (2006.01)

(52) U.S. Cl.
  CPC ...... *F04C 29/0057* (2013.01); *F04C 29/0085* (2013.01); *H02K 1/28* (2013.01); *F04C 2240/807* (2013.01)

(58) Field of Classification Search
  USPC .............................. 417/410.5; 418/55.1, 151
  See application file for complete search history.

(56) References Cited

FOREIGN PATENT DOCUMENTS

| | | |
|---|---|---|
| JP | 2010-144528 A | 7/2010 |
| WO | 2005/040610 A1 | 5/2005 |

OTHER PUBLICATIONS

European Search Report of corresponding EP Application No. 13 84 1784.5 dated Jul. 1, 2016.
International Preliminary Report of corresponding PCT Application No. PCT/JP2013/003812 dated Apr. 9, 2015.

* cited by examiner

ROTARY COMPRESSOR WITH THE BALANCE WEIGHT FORMED WITH A RECESS FOR RECEIVING THE HEAD OF A RIVET

CROSS-REFERENCE TO RELATED APPLICATIONS

This U.S. National stage application claims priority under 35 U.S.C. §119(a) to Japanese Patent Application No. 2012-217961, filed in Japan on Sep. 28, 2012, the entire contents of which are hereby incorporated herein by reference.

TECHNICAL FIELD

The present invention relates to a rotary compressor including a balance weight mechanism.

BACKGROUND ART

Rotary compressors for compressing fluid known in the art have been widely applied for apparatuses such as refrigerating apparatuses.

For example, a rotary compressor disclosed in Japanese Unexamined Patent Publication No. 2007-154657 has a casing including an electric motor and a compression mechanism. The electric motor includes a stator fixed to the casing, and a rotor inserted into the stator. The compression mechanism is connected to the electric motor via the drive shaft. The compression mechanism includes a cylinder having a cylinder chamber, and a piston fitted onto an eccentric portion of the drive shaft. When the electric motor receives power, the rotor rotates inside the stator. Accordingly, the drive shaft and thus the piston rotate. The rotation of the piston reduces the volume of the cylinder chamber to compress the fluid in the chamber.

The rotary compressor cited in Japanese Unexamined Patent Publication No. 2007-154657 includes a balance weight mechanism to obtain a proper mass balance between the balance weight mechanism and the eccentric part of the drive shaft. Specifically, the balance weight mechanism, which is shaped into an approximate column, includes a solid portion and a hollow portion to adjust the mass balance. Furthermore, an outer end portion of the balance weight mechanism has a flat portion in the axial direction. The balance weight mechanism is fixed to the rotor by a rivet inserted into the flat portion.

Hence, the balance weight mechanism fixed to the rotor enables the rotary compressor cited in Japanese Unexamined Patent Publication No. 2007-154657 to obtain a proper mass balance between the balance weight mechanism and the eccentric part to reduce vibration of the rotary compressor. Furthermore, the flat portion provided to the balance weight mechanism reduces agitation loss caused by the rotation of the balance weight mechanism.

SUMMARY

Technical Problem

The flat portion of the balance weight mechanism disclosed in Patent Document 1 has a counterbore that fits the head of the rivet. The counterbore makes the flat portion uneven, and such unevenness hinders a sufficient decrease in agitation loss caused by the rotation of the balance weight mechanism.

It is therefore an object of the present invention to provide, for a rotary compressor, a balance weight mechanism that can sufficiently decrease agitation loss.

Solution to the Problem

A rotary compressor according to a first aspect of the present invention includes: a casing (11); an electric motor (30) including a stator (31) fixed to the casing (11), and also including a rotor (32); a compression mechanism (50) connected to the electric motor (30) via a drive shaft (40); and a balance weight mechanism (60, 70) which causes centrifugal force to act on the drive shaft (40). The rotor (32) includes: a rotor core (32a) including stacked multiple electromagnetic steel sheets; and a rivet (34) which clamps the rotor core (32a) at both axial ends of the rotor core (32a). The balance weight mechanism (60, 70) includes: an insertion portion (68, 78) into which drive shaft (40) is press fit; and a flat portion (67, 77) forming a flat surface to an axial end of the drive shaft (40). The balance weight mechanism (60, 70) is placed to an axial end portion of the rotor (32) to cover a head (34b) of the rivet (34).

In the first aspect, the rotor core (32a), including stacked multiple electromagnetic steel sheets, is clamped by the heads (34b) of the rivet (34). This allows the electromagnetic steel sheets of the rotor core (32a) to be formed in one unit. Furthermore, the balance weight mechanism (60, 70) of the present invention has the flat portion (67, 77) forming a flat surface to an axial end of the drive shaft (40). This enables a reduction in agitation loss caused when the balance weight mechanism (60, 70) rotates. Moreover, the balance weight mechanism (60, 70) is placed to cover the head (34b) of the rivet (34). This keeps the head (34b) of the rivet (34) unexposed at an axial end surface of the balance weight mechanism (60, 70). In other words, the flat portion (67, 77) of the present invention forms a flat surface having no unevenness caused by, for example, a counterbore. This enables a sufficient reduction in agitation loss caused when the balance weight mechanism (60, 70) rotates. Furthermore, the balance weight mechanism (60, 70) is fixed to the drive shaft (40) by a press fit of the drive shaft (40) to the insertion portion (68, 78).

In a second aspect of the present invention, the balance weight mechanism (60, 70) in the first aspect can include a recess (66, 76) into which the head (34b) of the rivet (34) fits, and the recess (66, 76) is formed on an end portion of the balance weight mechanism (60, 70) at the rotor (32).

In the second aspect, the head (34b) of the rivet (34) fits into the recess (66, 76) of the balance weight mechanism (60, 70). This can determine a radially relative position of the balance weight mechanism (60, 70) with respect to the rotor (32) and the drive shaft (40).

Advantages of the Invention

In the present invention, the balance weight mechanism (60, 70) having the flat portion (67, 77) is placed to an end of a shaft of the rotor (32) to cover the head (34b) of the rivet (34). This allows a reduction in agitation loss caused by the rotation of the balance weight mechanism (60, 70).

Furthermore, the balance weight mechanism (60, 70) is fixed by press-fit of the drive shaft (40) in the insertion portion (68, 78). Hence this allows the balance weight mechanism (60, 70) to be attached to an axial end portion of the rotor (32), without welding. This can prevent electromagnetic steel sheets of the rotor (32) from straining and demagnetizing caused by the heat in welding.

Furthermore, as the balance weight mechanism (60, 70) is press fit and fixed to the drive shaft (40), centrifugal force of the balance weight mechanism (60, 70) can be received at the drive shaft (40). In other words, the present invention can prevent the centrifugal force of the balance weight mechanism (60, 70) from acting on the rotor (32). Hence, even though the electric motor runs relatively fast, the present invention can prevent deformation of the rotor (32) caused by the centrifugal force of the balance weight mechanism (60, 70), and thus can prevent a decrease in motor efficiency of the electric motor (30).

In the second aspect, the head (34b) of the rivet (34) fits into the recess (66, 76) of the balance weight mechanism (60, 70). This easily determines a radially relative position of the balance weight mechanism (60, 70) with respect to the rotor (32) and the drive shaft (40). Furthermore, the recess (66, 76) can be used as a stopper for the balance weight mechanism (60, 70) by accepting the head (34b) of the rivet (34).

DESCRIPTION OF EMBODIMENT

An embodiment of the present invention will be described in detail hereinafter with reference to the drawings. The embodiment below is merely a preferred example in nature, and is not intended to limit the scope, applications, and use of the present invention.

The embodiment of the present invention will be described below. The embodiment details a rotary compressor (10) that compresses fluid. The compressor (10) is applied to a refrigerating apparatus, such as a cooling appliance, and an air conditioner. Specifically, for example, such a refrigerating apparatus includes a refrigerant circuit charged with refrigerant. The refrigerant circuit is connected to the compressor (10). The refrigerant circuit performs a vapor-compression refrigeration cycle in which the refrigerant compressed by the compressor (10) is dissipated by a condenser radiator), depressurized by a decompression mechanism, and then evaporated by an evaporator.

(Basic Structure of Compressor)

Figure 1:
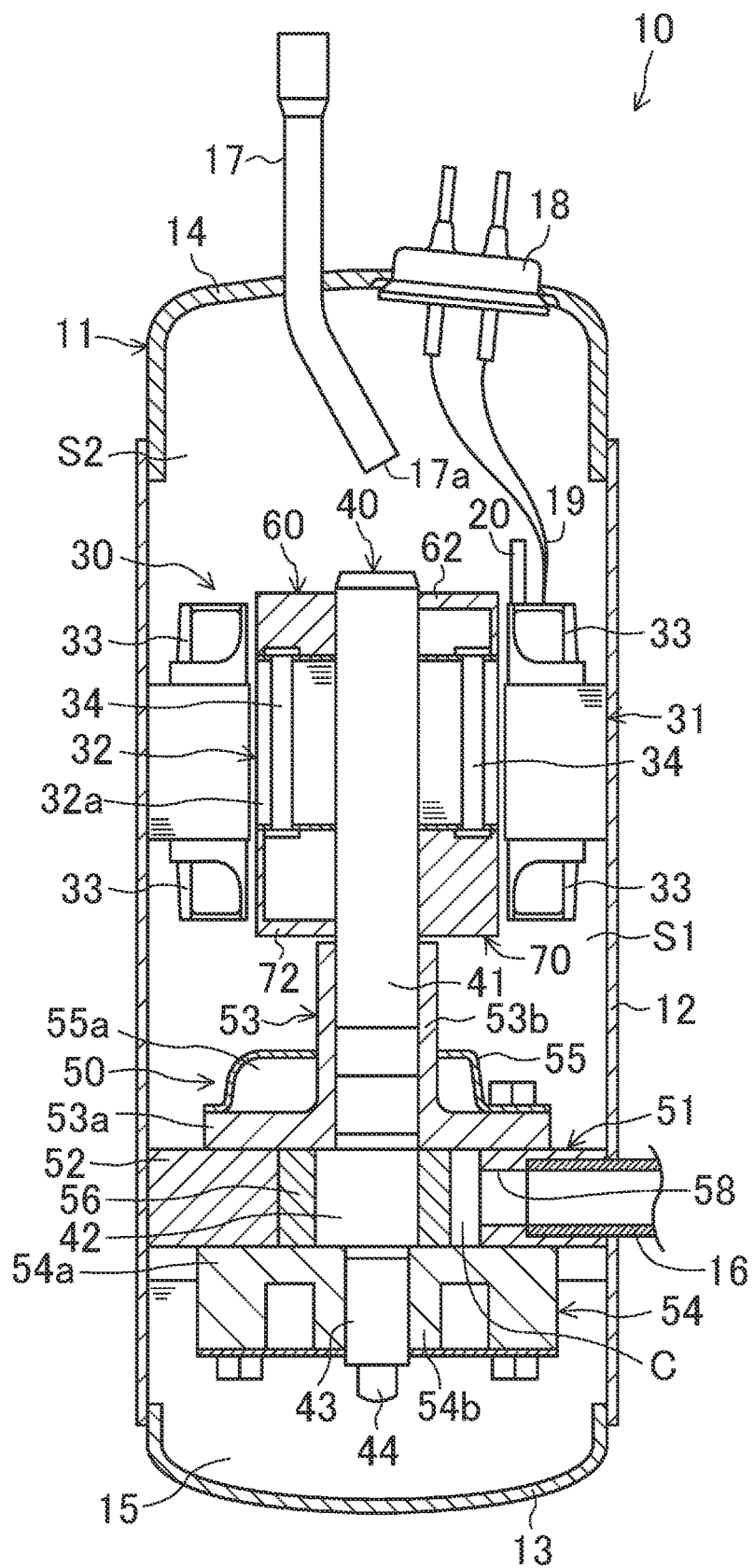
FIG. 1 is a longitudinal cross section of a compressor according to an embodiment.

As illustrated in FIG. 1, the compressor (10) includes an oblong casing (11), and an electric motor (30), a drive shaft (40), and a compression mechanism (50) that are contained in the casing (11). The casing (11) is a fully-closed cylindrical container. The casing (11) includes a barrel (12) shaped liked a tube, a lower end plate (13) that closes a lower portion of the barrel (12), and an upper end plate (14) that closes an upper portion of the barrel (12). An internal space of the casing (11) is filled with the refrigerant discharged from the compression mechanism (50). In other words, the compressor (10) is of what is referred to as a high-pressure dome type. In addition, the internal space of the casing (11) includes a first space (S1) between the compression mechanism (50) and the electric motor (30), and a second space (S2) above the electric motor (30). Furthermore, an oil sump (15) is formed on a bottom of the casing (11) to store oil. The oil sump (15) stores oil. (lubricating oil) that is used for lubricating the compression mechanism (50) and each of sliding parts such as a bearing (53b, 54b).

The compressor (10) includes a suction pipe (16), a discharge pipe (17), and a terminal (18). The suction pipe (16) radially penetrates a lower portion of the barrel (12), and is connected to a suction port (58) of the compression mechanism (50). The discharge pipe (17), which axially penetrates the upper end plate (14), has an inlet (17a) that communicates with the internal space of the casing (11). The inlet (17a) of the discharge pipe (17) is radially positioned at the center of the second space (S2). The terminal (18) is a relay terminal for supplying external power of the compressor (10) to the electric motor (30). The terminal (18) is inserted into the upper end plate (14), and then fixed.

The electric motor (30) is fixed to an inner surface of the barrel (2) between the inlet (17a) of the discharge pipe (17) and the compression mechanism (50). The electric motor (30) includes a stator (31) fixed to the casing (11), and a rotor (32) inserted into the stator (31). An outer circumferential surface of the stator (31) has a core cut (not shown) along both axial ends of the stator (31). The core cut forms a fluid channel whose axially orthogonal cross section is either rectangular or fan-shaped, and allows the first space (S1) and the second space (S2) to communicate with each other.

The stator (31) includes electromagnetic steel sheets shaped by pressing and stacked in an axial direction of the drive shaft (40). The stator (31) has, at both axial end portions thereof, coil ends (33) where coils are wound. Of the coil ends (33), a coil end (33), which is provided above the stator (31) and relatively closer to the terminal (18), is connected to a wiring line (19) from the terminal (18).

Furthermore, the stator (31) according to the embodiment has a guiding plate (20) that radially guides the wiring line (19) toward outside. The guiding plate (20) extends upward from the coil end (33) above the stator (31). An upper end of the guiding plate (20) is positioned above that of an upper balance weight mechanism (60) that will be detailed later. When the electric motor (30) runs, the guiding plate (20) prevents the rotating upper balance weight mechanism (60) and the wiring line (119) from interfering with each other.

Figure 2:
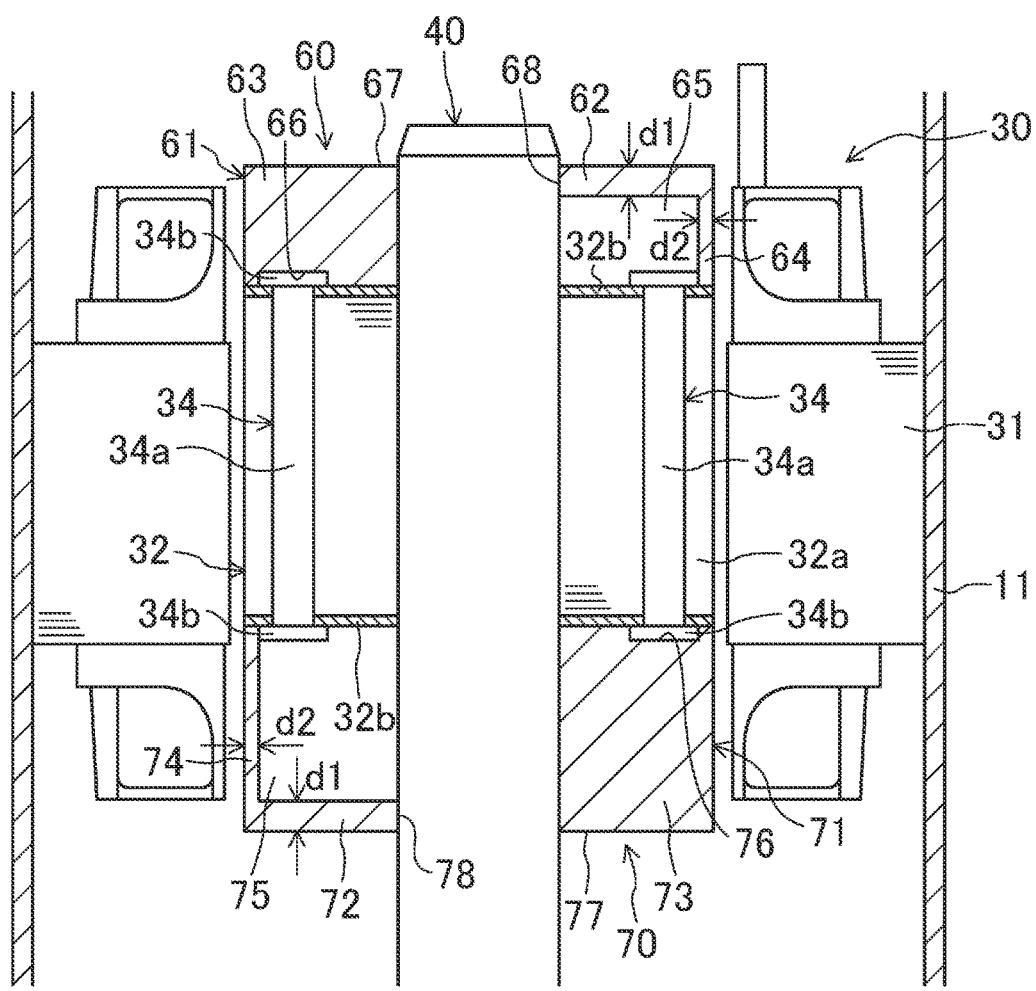
FIG. 2 is a longitudinal cross section enlarging the electric motor according to the embodiment.

As illustrated in FIG. 2, the rotor (32) includes a rotor core (32a), and a pair of end plates (32b) each axially stacked on one of the both ends of the rotor core (32a). The rotor core (32a) includes annular electromagnetic steel sheets shaped by pressing and stacked in the axial direction of the drive shaft (40). The end plate (32b) is made of a non-magnetic material such as, for example, stainless steel.

The rotor (32) according to the embodiment is fixed to the drive shaft (40) by, for example, shrink fitting. The stator (31) is approximately as long (tall) as the rotor (32) in the axial direction. In contrast, the rotor (32) is positioned slightly above the stator (31). In other words, a lower end portion of the stator (31) has a non-facing portion that does not face the rotor (32). This allows the electric motor (30) to generate downward magnetic force, also referred to as magnetic pull force, which attracts the rotor (32) toward the non-facing portion of the stator (31). As a result, vertical vibrations of the drive shaft (40) decrease.

The electric motor (30) according to the embodiment has multiple rivets (34) that clamp both of axial end portions of the rotor (32). Each of the rivets (34) has a pin (34a) axially penetrating the rotor (32), and heads (34b) each formed on one of both ends of the pin (34a) and having a larger diameter than that of the pin (34a). In other words, in the rotor (32), a pair of the heads (34b) clamp the electromagnetic steel sheets axially inward to form the electromagnetic steel sheets in one unit. For example, four rivets (34) are peripherally arranged at regular intervals (90 degrees) for the rotor (32) according to the embodiment.

As illustrated in FIG. 1, the drive shaft (40) connects the electric motor (30) to the compression mechanism (50), and drives the compression mechanism (50). The drive shaft (40) includes a main shaft (41), a crankshaft (eccentric part) (42) connected to a lower end of the main shaft (41), a sub shaft (43) connected to a lower end of the crankshaft (42), and an oil pump (44) connected to a lower end of the sub shaft (43). Axes of the main shaft (41) and the sub shaft (43) are approximately aligned with each other. In contrast, an axis of the crankshaft (42) is offset from those of the main shaft (41) and the sub shaft (43). Furthermore, an outside diameter of the crankshaft (42) is larger than those of the main shaft (41) and the sub shaft (43). The oil pump (44) works as a pump system to pump the oil in the oil sump (15) upward. The oil pumped by the oil pump (44) is supplied to each of sliding parts, such as the compression mechanism (50) and the drive shaft (40), via an oil path (not shown) inside the drive shaft (40), and used for lubrication of the sliding parts.

The compression mechanism (50) includes a piston container (51) fixed to an interior wall of the barrel (12) of the casing (11), and a piston (56) contained in the piston container (51). The piston container (51) includes a cylinder (52) shaped into a ring, a front head (53) closing an upper opening of the cylinder (52), and a rear head (54) closing a lower opening of the cylinder (52). Hence, a cylinder chamber (C) is provided inside the piston container (51). The cylinder chamber (C) is shaped into a column, and formed among the cylinder (52), the front head (53), and the rear head (54).

The cylinder (52) is an approximately annular member fixed to the interior wall of the barrel (12) of the casing (11). Inside the cylinder (52), the suction port (58) radially penetrating the cylinder (52) is formed. The suction port (58) has an inlet end connected to the suction pipe (16), and an outlet end communicating with an inlet unit of the cylinder chamber (C).

The front head (53) includes an upper closer (53a) shaped into a disk, and a main bearing (53b) projecting upward from a central portion of the upper closer (53a). The main bearing (53b) rotatably supports the main shaft (41) of the drive shaft (40). Inside the upper closer (53a), a discharge port (not shown) is provided. The discharge port axially penetrates the upper closer (53a). The discharge port has an inlet end communicating with a discharging part of the cylinder chamber (C), and an outlet end communicating with the first space (S1) via a sound absorbing chamber (55a) in a muffler member (55).

The rear head (54) includes a lower closer (54a) shaped into a disk, and a sub bearing (54b) projecting downward from a central portion of the lower closer (54a). The lower closer (54a) forms a thrust bearing of the crankshaft (42). The sub bearing (54b) rotatably supports the sub shaft (43) of the drive shaft (40).

The compression mechanism (50) includes the piston (56) contained in the cylinder chamber (C) and shaped into a ring. The piston (56) fits onto the crankshaft (42). Furthermore, the cylinder chamber (C) has one end inserted into the interior portion of the cylinder (52) and another end provided with a blade (not shown) connecting to an outer circumferential surface of the piston (56). This blade separates the inside of the cylinder chamber (C) into a low pressure chamber (low pressure portion) communicating with the suction port (58), and a high pressure chamber (high pressure portion) communicating with the discharge port.

When the crankshaft (42) eccentrically rotates with the rotation of the drive shaft (40), the piston (56) eccentrically rotates in the cylinder chamber (C). This eccentric rotation of the piston and the resulting increase in volume of the low pressure chamber cause the refrigerant to be sucked into the low pressure chamber via the suction port (58). Simultaneously, a decrease in volume of the high-pressure chamber increases the pressure of the refrigerant in the high-pressure chamber. When internal pressure of the high-pressure chamber exceeds a predetermined value, a valve mechanism (a reed valve, for example) of the discharge port opens, and the refrigerant is discharged into the first space (S1) via the discharge port.

(Structure of the Balance Weight Mechanism)

As illustrated in FIG. 2, the compressor (10) according to the embodiment includes a pair of balance weight mechanisms (60, 70). Each of the balance weight mechanisms (60, 70) has a center of gravity that is eccentrically offset, in predetermined amount, relative to the axis of the drive shaft (40). The balance weight mechanism (60, 70) causes centrifugal force to act on the drive shaft (40) to cancel out centrifugal force of the crankshaft (42). Specifically, the compressor (10) includes the upper balance weight mechanism (60) above the rotor (32), and a lower balance weight mechanism (70) below the rotor (32). The centers of gravity of the upper balance weight mechanism (60) and the lower balance weight mechanism (70) are offset 180° with each other around the axis of the drive shaft (40).

Each balance weight mechanism (60, 70) includes a main body (61, 71), and an annular plate portion (62, 72) formed at an axial outer end portion of the main body (61, 71). Specifically, the upper balance weight mechanism (60) has the annular plate portion (62) formed above the main body (61), and the lower balance weight mechanism (70) has the annular plate portion (72) formed below the main body (71). Each main body (61, 71) is shaped cylindrically such that the drive shaft (40) axially penetrates thereinto. Each main body (61, 71) includes a solid portion (63, 73) shaped into an approximate fan around the drive shaft (40), and an outer circumferential plate portion (64, 74) shaped into an approximate arc and circumferentially continuing from an outer circumferential surface of the solid portion (63, 73). The solid portion (63, 73) is formed, for example, across the range of greater than approximately 180° in the main body (61, 71) (see FIG. 3). Inside the outer circumferential plate portion (64, 74), a hollow portion (65, 75) shaped into an approximate fan is formed. While each balance weight mechanism (60, 70) is placed to an axial end portion of the rotor (32), the hollow portion (65, 75) defines a closed space that is closed by the solid portion (63, 73), the outer circumferential plate portion (64, 74), the drive shaft (40), and the rotor (32). Hence, each balance weight mechanism (60, 70) makes it possible to adjust its center of gravity, depending on the positions and the volumes of the solid portion (63, 73) and the hollow portion (65, 75).

Figure 3:
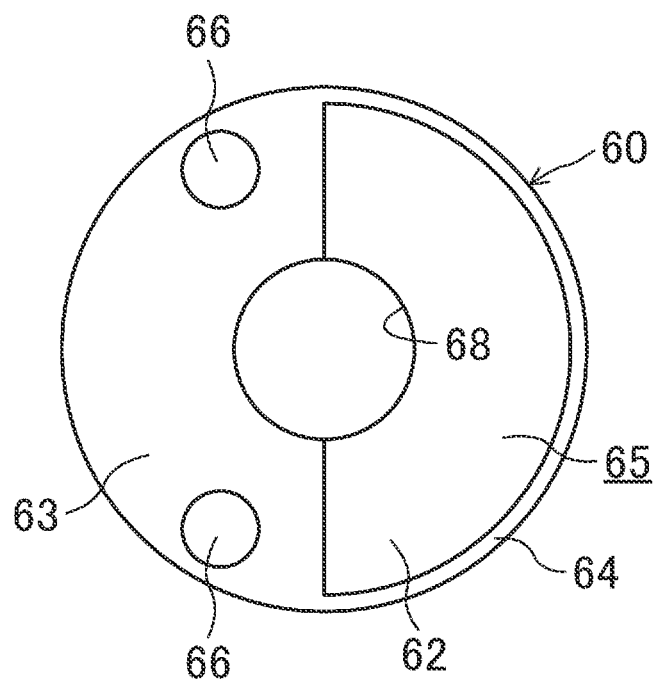
FIG. 3 is a bottom view of an upper balance weight mechanism according to the embodiment.

Each solid portion (63, 73) has, at an axial inner end surface thereof, the recess (66, 76) shaped into a column (see FIGS. 2 and 3). Specifically, the upper balance weight mechanism (60) has the recess (66) formed in a lower surface of the solid portion (63), and the lower balance weight mechanism (70) has the recess (76) formed in an upper surface of the solid portion (73). The solid portion (73) according to the embodiment has, for example, two recesses (76) circumferentially arranged at an interval of 90°. Each recess (76) has an inner diameter slightly larger than an outer diameter of the head (34b) of the rivet (34) corresponding to the recess (76). When each balance weight mechanism (60, 70) is attached, each of the heads (34b) of the rivets (34) fits into a corresponding one of the recesses (66, 76). In other words, each recess (66, 76) acts as a positioning portion for determining a relative position of the balance weight mechanism (60, 70). This optimizes a position of the center of gravity of the balance weight mechanism (60, 70), and allows desired centrifugal force to act on the drive shaft (40).

Each annular plate portion (62, 72), shaped into a ring, is casted together with the main body (61, 71). The annular plate portion (62, 72) has, at an axial outer end surface thereof, the flat portion (67, 77) shaped into a horizontal annular flat surface. Specifically, the upper balance weight mechanism (60) has the flat portion (67) shaped into a ring above the annular plate portion (62), and the lower balance weight mechanism (70) has the annular plate portion (72) formed below the annular plate portion (72). Hence, forming the flat portion (67, 77) for each balance weight mechanism (60, 70) makes it possible to reduce agitation loss caused by the rotation of the balance weight mechanism (60, 70) even though the electric motor (30) runs at a relatively high speed.

Each annular plate portion (62, 72) has, at a radial central portion thereof, an insertion portion (68, 78) into which drive shaft (40) penetrates. Before each balance weight mechanism (60, 70) is attached, an inner diameter of the insertion portion (68, 78) is slightly smaller than an outer diameter of the drive shaft (40). Then, when attached, each balance weight mechanism (60, 70) is fixed to the drive shaft (40) by press fit of the drive shaft (40) in the insertion portion (68, 78) of the annular plate portion (62, 72). Here, the upper balance weight mechanism (60) is positioned by each recess (66) of the upper balance weight mechanism (60) fitting onto an upper head (34b) of a corresponding one of the rivets (34). Furthermore, the lower balance weight mechanism (70) is positioned by each recess (76) of the lower balance weight mechanism (70) fitting onto a lower head (34b) of a corresponding one of the rivets (34). It is noted that, when each balance weight mechanism (60, 70) is attached, the main body (61, 71) and the rotor (32) are not directly fixed to but simply in contact with each other.

As the drive shaft (40) is press fit into the insertion portion (68, 78) of the annular plate portion (62, 72) of each balance weight mechanism (60, 70), the annular plate portion (62, 72) and the drive shaft (40) are attached firmly to each other. This makes it possible to fix the balance weight mechanism (60, 70) to the drive shaft (40), and seal a gap between the annular plate portion (62, 72) and the drive shaft (40).

Furthermore, in each balance weight mechanism (60, 70), an axial thickness d1 of the annular plate portion (62, 72) is greater than a radial thickness d2 of the outer circumferential plate portion (64, 74). Thus, in each balance weight mechanism (60, 70), the insertion portion (68, 78) of the annular plate portion (62, 72) is ensured to have a sufficient press-fit allowance. This sufficient press-fit allowance increases attachment strength of the balance weight mechanism (60, 70) with respect to the drive shaft (40), and ensures prevention of oil leak from the gap between the drive shaft (40) and the insertion portion (68, 78).

Operation

Next, operation of the compressor (10) according to the embodiment will be described with reference to FIG. 1. When the electric motor (30) runs, a rotating magnetic field is produced between the stator (31) and the rotor (32) to rotate the rotor (32), and then the drive shaft (40). The rotation of the crankshaft (42) along with the drive shaft (40) causes the piston (56) to rotate in the cylinder chamber (C). This allows refrigerant to be sucked from the suction port (58) into the cylinder chamber (C), and the sucked refrigerant to be compressed in the cylinder chamber (C). The compressed refrigerant under high pressure outflows to the first space (S1) via the discharge port and the sound absorbing chamber (55a). The refrigerant in the first space (S1) flows upward through interspaces in the electric motor (30), such as the core cut, an air gap, and a coil slot, and outflows to the second space (S2). The refrigerant in the second space (S2) outflows to the discharge pipe (17) to be used for a refrigeration cycle of a refrigerating apparatus.

Moreover, the rotation of the drive shaft (40) by the operation of the electric motor (30) causes the oil in the oil sump (15) to be sucked into the oil pump (44). The oil is supplied into the sliding parts, such as the piston (56) and each bearing (53b, 54b), via an oil channel inside the drive shaft (40), and used for lubrication of the sliding parts. The oil used for the lubrication of the sliding parts is separated from the refrigerant in the internal space of the casing (11), and collected in the oil sump (15).

Advantages of the Embodiment

In the above embodiment, each of the balance weight mechanisms (60, 70) is placed to one of axial ends of the rotor (32) to cover the head (34b) of the rivet (34). This keeps the head (34b) of the rivet (34) and a counterbore corresponding to the head (34b) unexposed to an axial outside of each balance weight mechanism (60, 70) (the first space (S1) and the second space (S2)), in other words, the flat portion (67, 77) of the balance weight mechanism (60, 70) according to the embodiment forms a flat surface having no unevenness caused by, for example, a counterbore. This enables a sufficient reduction in agitation loss caused when the balance weight mechanism (60, 70) rotates.

Furthermore, the balance weight mechanism (60, 70) is fixed by the press fit of the drive shaft (40) in the insertion portion (68, 78). Hence, this allows the balance weight mechanism (60, 70) to be attached to the axial end portion of the rotor (32) without welding. This can prevent electromagnetic steel sheets of the rotor (32) from straining and demagnetizing caused by the heat in welding.

Furthermore, as the balance weight mechanism (60, 70) is press fit and fixed to the drive shaft (40), centrifugal force of the balance weight mechanism (60, 70) can be received at the drive shaft (40). In other words, the present invention can prevent the centrifugal force of the balance weight mechanism (60, 70) from acting on the rotor 32. Hence, even though the electric motor runs relatively fast, the present invention can prevent deformation of the rotor (32) caused by the centrifugal force of the balance weight mechanism (60, 70), and thus can prevent a decrease in motor efficiency of the electric motor (30).

Moreover, each balance weight mechanism (60, 70) includes a recess (66, 76) into which the head (34b) of the rivet (34) fits, and the recess (66, 76) is formed on each end portion of the balance weight mechanism (60, 70) at the rotor (32). Hence, the head (34b) of the rivet (34) fits into the recess (66, 76) of the balance weight mechanism (60, 70). This can easily determine a radially relative position of the balance weight mechanism (60, 70) with respect to the rotor (32) and the drive shaft (40). Furthermore, the recess (66, 76) can be used as a stopper for the balance weight mechanism (60, 70) against the drive shaft (40).

INDUSTRIAL APPLICABILITY

As described above, the present invention is useful for a rotary compressor including a balance weight mechanism.

What is claimed is:

1. A rotary compressor comprising:
a casing;
an electric motor including a stator fixed to the casing, and a rotor;

a compression mechanism connected to the electric motor via a drive shaft; and a balance weight mechanism configured to cause centrifugal force to act on the drive shaft, the rotor including
- a rotor core including a plurality of stacked electromagnetic steel sheets, and
- a rivet configured to clamp the rotor core at axial ends of the rotor core, the balance weight mechanism including
- an insertion portion into which drive shaft is press fit, and
- a flat portion forming a flat surface at an axial end of the drive shaft, and a recess into which the head of the rivet fits, and the balance weight mechanism being disposed at an axial end portion of the rotor to cover a head of the rivet.

2. The rotary compressor of claim 1, wherein the recess is formed on an end portion of the balance weight mechanism at the rotor.

* * * * *